M. P. HAUPT.
MOTOR VEHICLE.
APPLICATION FILED AUG. 13, 1917.

1,302,545.

Patented May 6, 1919.
2 SHEETS—SHEET 1.

Inventor
Mathias P. Haupt.

By Herbert E. Smith
Attorney

M. P. HAUPT.
MOTOR VEHICLE.
APPLICATION FILED AUG. 13, 1917.
1,302,545.
Patented May 6, 1919.
2 SHEETS—SHEET 2.
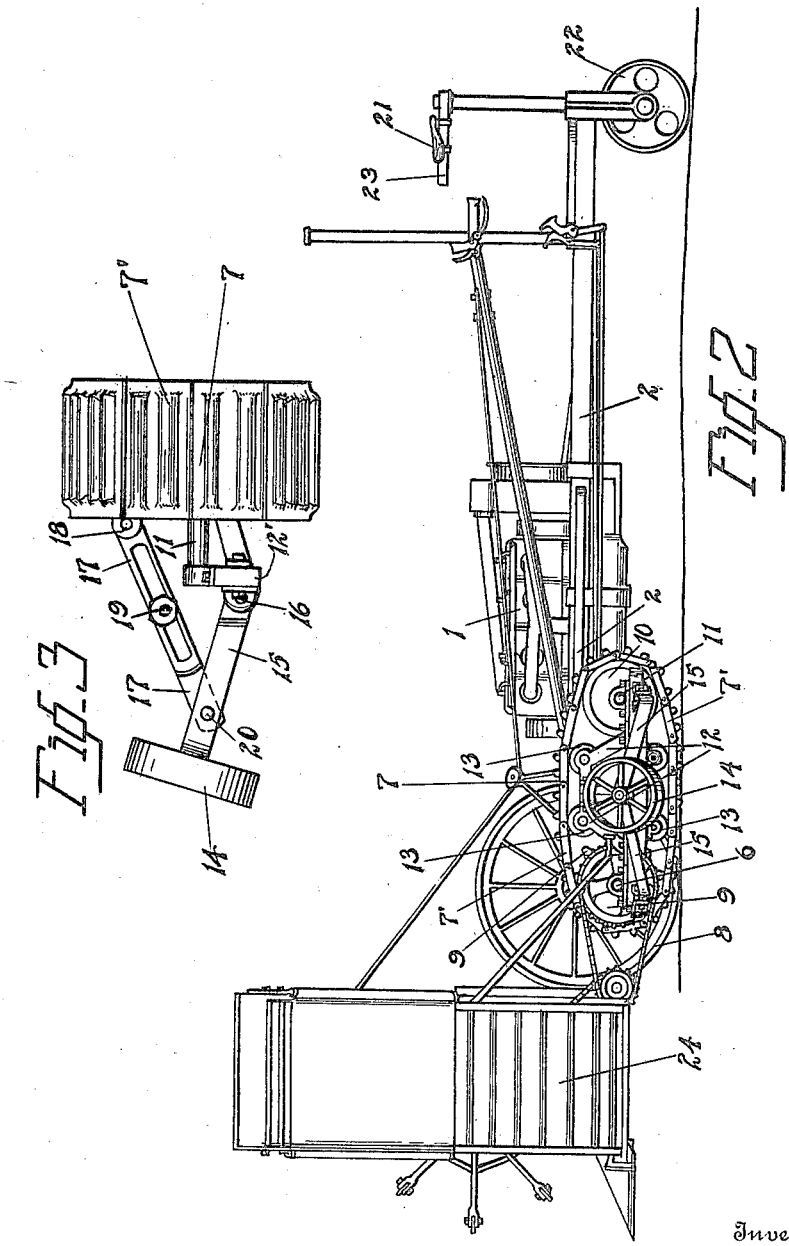
Inventor
Mathias P. Haupt.
By Herbert E. Smith
Attorney

UNITED STATES PATENT OFFICE.

MATHIAS P. HAUPT, OF SPOKANE, WASHINGTON.

MOTOR-VEHICLE.

1,302,545.　　　　　Specification of Letters Patent.　　Patented May 6, 1919.

Application filed August 13, 1917.　Serial No. 185,935.

*To all whom it may concern:*

Be it known that I, MATHIAS P. HAUPT, a citizen of the United States, residing at Spokane, in the county of Spokane and State of Washington, have invented certain new and useful Improvements in Motor-Vehicles, of which the following is a specification.

This invention relates to improvements in motor vehicles especially applicable for use in connection with agricultural implements such as headers, binders and similar machines, and while the invention is herein illustrated as applied to a header, and for convenience will be referred to and claimed in connection with a header, it will be understood that its use is not limited to such machines.

The primary object of the invention is the provision of a tractor of this type, in order to dispense with the use of horses, and also to adapt the implement and its tractor especially for side hill work.

The invention consists in certain novel combinations and arrangements of parts as hereinafter described and claimed.

In the accompanying drawings one complete example of the physical embodiment of the invention is illustrated, constructed according to the best mode so far devised for the practical application of the principles of the invention, which embodiment has thus far been perfectly satisfactory in actual use.

Fig. 2 is a side elevation of the machine.

Fig. 3 is a rear view of the driving wheel, showing also the auxiliary supporting wheel to prevent tipping of the tractor.

Figure 1:
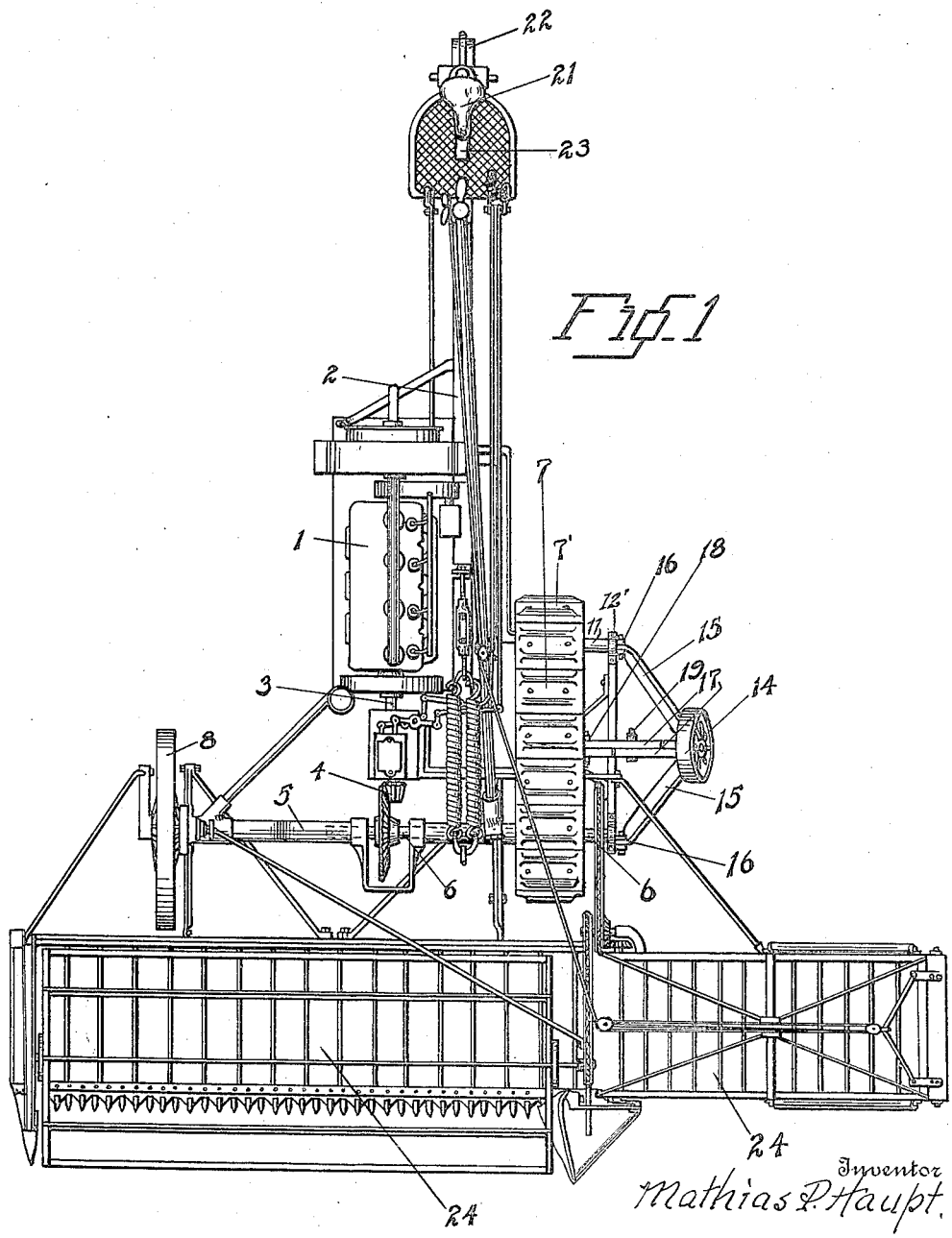
Figure 1 is a top plan view of an implement and its tractor embodying the novel features of the invention.

In the preferred embodiment of the invention as exemplified in the drawings a standard type of internal combustion engine or motor is indicated by the numeral 1, and the engine is properly supported on the main frame 2 and equipped with the usual driving or engine shaft 3, and bevel gear coupling 4. The tubular axle 5 forms one of the transverse members of the frame and supports the counter shaft 6, which will hereinafter be referred to as the driving shaft, located forward of the engine 1, and designed to operate the driving wheel 7, which as shown in the drawings is of the caterpillar type. A traction wheel 8 of usual type is disposed opposite the driving wheel to support the machine, and it will be seen that the engine and two supporting wheels are so located with relation to each other, that the weight of the engine will tend to hold the tractor on the ground, the center of gravity being comparatively low and near the ground. This arrangement and location of parts enables the implement to travel and work on steep side hills.

The belt 7' of the driving wheel is of usual or standard construction and comprises the linked sections of well known form, and is driven through the driving shaft by means of the driving sprocket 9 on the end of said shaft. At the rear the belt travels over a supporting pulley or roller 10 on the shaft 11, the latter being journaled in the supplemental frame 12 provided, and attached to the main frame, for supporting the driving mechanism of the implement. This frame also supports a plurality of supporting wheels or rollers 13, arranged in pairs above and below the axis of the two shafts 6 and 11 and adapted to guide and support the belt 7' of the wheel 7, and these rollers, together with the end supporting wheels of the belt, hold it in an elliptical form as seen in Fig. 2.

In order to prevent tipping or tilting over of the implement and tractor while working on an unusually steep hillside, an auxiliary supporting wheel 14 is provided at the side of the tractor, adjacent the driving wheel. An out-rigging, comprising an extension frame 12', is projected from the frame 12 and designed to support the auxiliary wheel and its connections, through the instrumentality of the adjustable arm 15 which is pivoted at 16 to the extension 12', and provides a journal for the wheel 14. The arm is adjustable on its pivot so that the wheel may be located close to the ground, or raised, within limits therefrom, in order to adapt the implement and its tractor to different conditions, and the arm may be held in adjusted position by utilization of the extensible, sectional bracket 17, pivotally anchored at 18 to the frame 12' and provided with a clamp bolt 19 to hold the sections in adjusted position. At 20 the bracket is pivoted to the wheel supporting arm, and as best seen in Fig. 3, the wheel may be raised or lowered, as desired by properly manipulating the arm and bracket, as will be readily understood.

The implement is steered by the operator or driver who occupies the seat 21 at the rear of the frame, and the trailer guide wheel 22 at the extreme rear of the frame is manipulated by the tiller 23 in usual manner. The levers and mechanism for controlling the movement and operation of the implement are of course located in position where they are accessible to the driver or operator, and the grain harvesting mechanism indicated at 24 at the front end of the implement is of suitable or approved type.

From the above description taken in connection with the accompanying drawings, it will be apparent that an improved and effective instrumentality is provided for harvesting, which eliminates the necessity for use of a large number of horses, but also provides a comparatively cheaper and more rapidly working implement for the purpose.

Having thus fully described the invention, what is claimed herein, is:—

1. The combination with a tractor as described and with its main frame, of an extension frame, a pivoted arm on the extension frame and an auxiliary wheel on the arm, and an extensible bracket pivoted on the frame at one end and to said arm at the other end, whereby the arm may be adjusted and held in adjusted position by said bracket.

2. The combination with a tractor as described including its main frame and steering wheel, of a transverse tubular axle forming part of the frame, a driving shaft having traction wheel and sprocket on the shaft, and transmission means from the engine shaft to the driving shaft, a supplemental frame supporting the driving shaft at one side of the main frame, a driving wheel of the caterpillar type including a driving belt on said sprocket and a supporting wheel co-acting with the sprocket, and belt supporting and guiding rollers supported in the supplemental frame.

3. The combination with the main frame, supplemental frame attached at the side of the main frame and driving wheel and operating means therefor, of an extension frame attached at the outside of the supplemental frame comprising a pivoted arm on the extension frame and an auxiliary wheel on the arm, and a slotted sectional bracket and clamping means on the extension frame for holding said arm in adjusted position.

In testimony whereof I affix my signature.

MATHIAS P. HAUPT.

Copies of this patent may be obtained for five cents each, by addressing the "Commissioner of Patents Washington, D. C."